United States Patent [19]

Isgar

[11] Patent Number: 4,558,865

[45] Date of Patent: Dec. 17, 1985

[54] KNOWLEDGE GAME APPARATUS AND METHOD AND CARD CADDY THEREFOR

[76] Inventor: Charles B. Isgar, 1014 S. Ogden, Denver, Colo. 80209

[21] Appl. No.: 665,349

[22] Filed: Oct. 26, 1984

[51] Int. Cl.⁴ .......................... A63F 1/04; A63F 1/10
[52] U.S. Cl. .................... 273/148 A; 211/50; 273/1 R; 273/296; 273/302; 434/327
[58] Field of Search ............... 273/1 R, 148 A, 296, 273/302; 211/50; 434/322, 327, 347

[56] References Cited

U.S. PATENT DOCUMENTS

| | | | |
|---|---|---|---|
| 595,440 | 12/1897 | James | 273/302 X |
| 1,745,946 | 2/1930 | Murray | 273/296 |
| 2,717,156 | 9/1955 | Nelson | 273/248 |
| 4,105,202 | 8/1978 | McLaren et al. | 273/296 X |
| 4,315,627 | 2/1982 | Schlegel | 273/249 |

Primary Examiner—Anton O. Oechsle
Attorney, Agent, or Firm—William J. Kubida

[57] ABSTRACT

A knowledge game and method and card caddy therefor includes a plurality of game cards having a backside thereof illustrating a question category and an opposite front side thereof having a number of questions relating to the question category. A card caddy contains the game cards and has an insertion slot for receipt of the game cards not won by a highest bidder of the players and a dispensing slot for withdrawal of an individual one of the cards. The card dispensing slot includes a window for viewing the backside of the individual one of the cards. A plurality of player card pockets are affixed to an outer surface of the card caddy corresponding to each of a plurality of players, the card pockets for retention of the game cards won by the highest bidder of the players.

19 Claims, 7 Drawing Figures

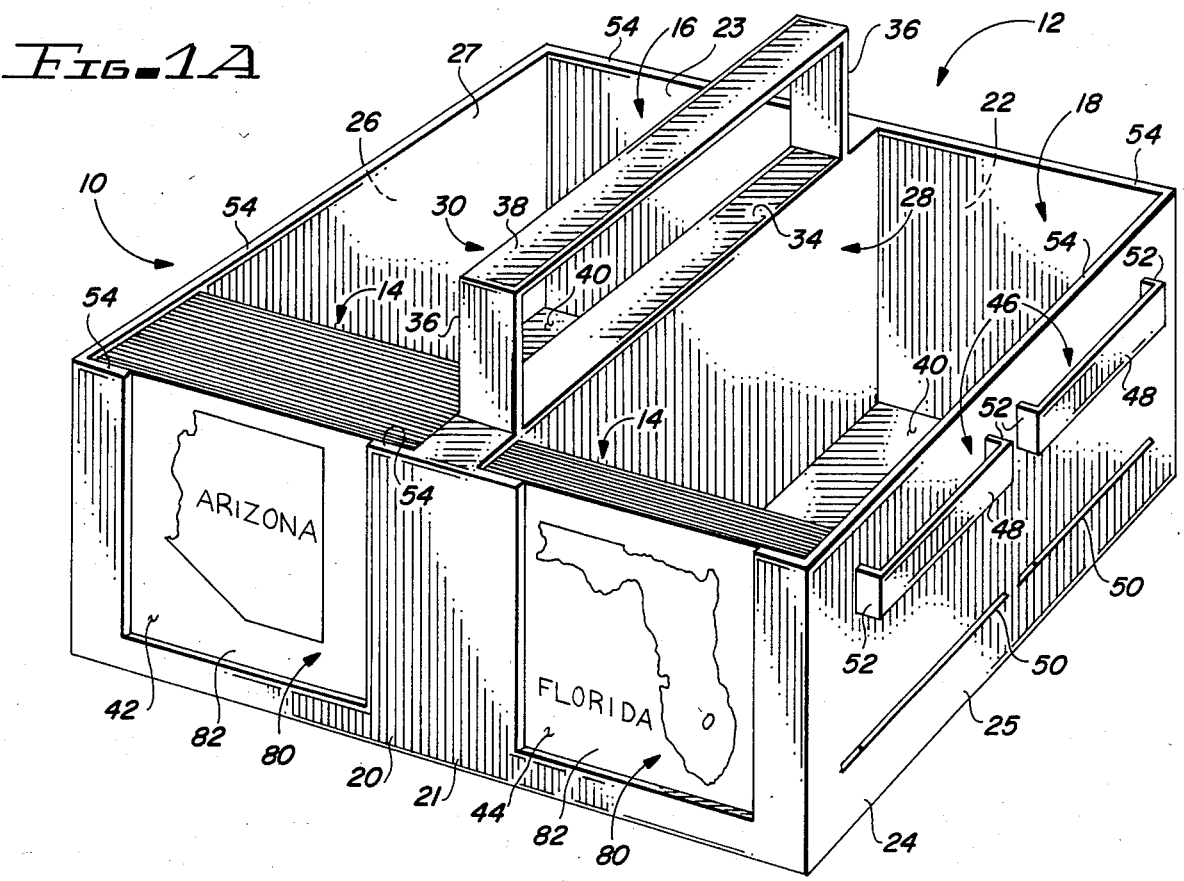

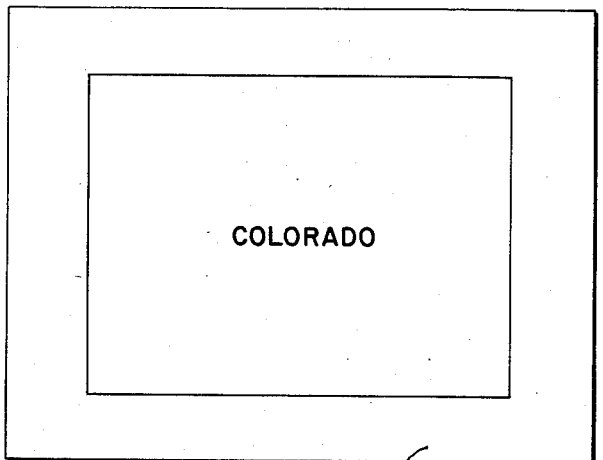

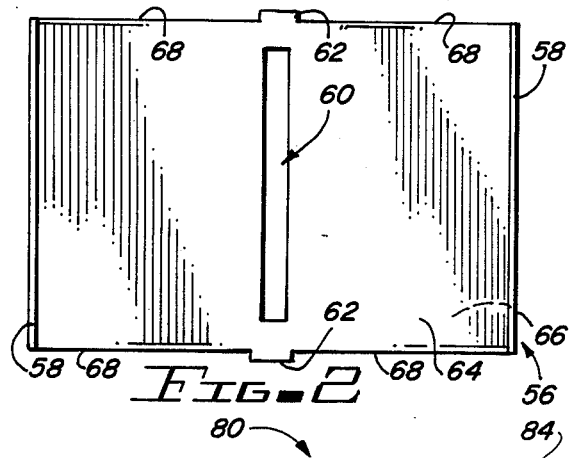

FIG-2

① THE CAPITAL OF THIS STATE IS ?
  (DENVER)
② THIS STATE IS COMMONLY KNOWN AS THE _____ STATE ?
  (CENTENNIAL)
③ THIS COLORADO SENATOR RAN FOR PRESIDENT IN 1984 ?
  (GARY HART)
④ THE HIGHEST AIRPORT IN THE U.S. IS IN THIS COLORADO MOUNTAIN TOWN ?
  (LEADVILLE)
⑤ WHAT TYPE OF ROCK HAS POTENTIAL OIL RESOURCES IN THIS STATE ?
  (OIL SHALE)

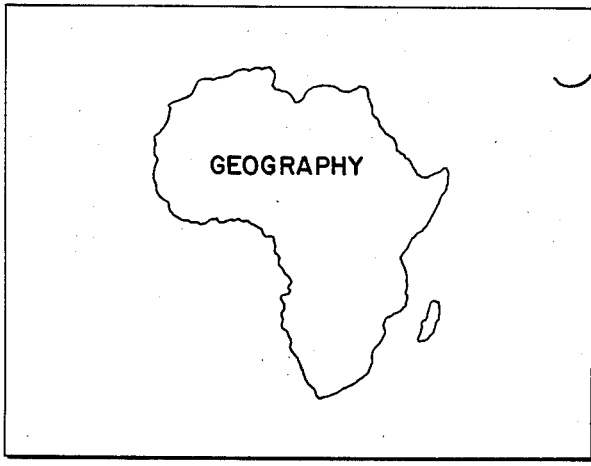

① THE CAPITAL OF LIBYA IS ?
  (TRIPOLI)
② THE COUNTRY ON THE SOUTH SIDE OF THE STRAIT OF GIBRALTAR IS ?
  (MOROCCO)
③ WHAT IS THE LARGE RIVER FLOWING THROUGH EGYPT ?
  (NILE)
④ CAPETOWN IS IN WHAT COUNTRY ?
  (SOUTH AFRICA)
⑤ THE LARGEST LAKE ON THIS CONTINENT IS ?
  (VICTORIA)

KNOWLEDGE GAME APPARATUS AND METHOD AND CARD CADDY THEREFOR

BACKGROUND OF THE INVENTION

The present invention relates, in general, to the field of knowledge game apparati and methods and card caddies therefor. More particularly, the present invention relates to a knowledge card game which utilizes a carrying caddy in lieu of a game board thereby providing greatly enhanced convenience of play in any location while concomitantly providing interesting and challenging play.

The well known and enormous recent popularity of trivia based games has been a tremendous boon to the entire board game business. Sales of the most popular of these games is expected to gross approximately $750,000,000.00 this year in the United States alone. Currently, there are approximately 40 trivia games on the market with more expected by years end. Among these, are trivia games designed for children, games based on specific subjects such as rock music, the bible and television as well as trivia games based on current events and recent history. As would likewise be expected, there are also trivia games based on sex.

The enormous popularity of these trivia games has paved the way for relatively high priced games to be developed geared to an audience looking for some level of intellectual challenge. Carrying price tags upward of $35.00 each, such trivia based games have represented a breakthrough in a board game business where the previous price ceiling had been thought to be on the order of $15.00 for a game of exceptional quality.

Authorities have determined that a successful game should have good replay such that it can be played repeatedly without the players becoming bored. Moreover, the game must be challenging and have a wide popular appeal. Inevitably, most popular games are those which require active thought on the part on the part of the participants.

Heretofore, such trivia based knowledge games have required a board or playing surface to be played. As a result, the playability of the game is limited to those areas in which the board or playing surface may be conveniently laid.

SUMMARY OF THE INVENTION

It is therefore an object of the present invention to provide an improved knowledge game apparatus and method and card caddy therefor.

It is further an object of the present invention to provide an improved knowledge game apparatus and method and card caddy therefor which is durable, portable and can be played anywhere without the necessity of a game board.

It is still further an object of the present invention to provide an improved knowledge game apparatus and method and card caddy therefor which includes added interest to a game experience by incorporating bidding and bluffing.

It is still further an object of the present invention to provide an improved knowledge game apparatus and method and card caddy therefor which may be readily adapted to a skill level of persons of any age or knowledge background merely by changing cards.

It is still further an object of the present invention to provide an improved knowledge game apparatus and method and card caddy therefore which provides a consistently challenging and enjoyable activity.

The foregoing and other objects are achieved in the present invention wherein there is provided a knowledge game and method for a plurality of players which includes a plurality of game cards having a backside thereof illustrative of a question category and an opposite front side thereof having N number of questions relating to the question category. A card caddy for containing the game cards has an insertion slot for receipt of the game cards not won by a highest bidder of the players and a dispensing slot for withdrawal of an individual one of the cards. The card dispensing slot includes a window for viewing the backside of the individual one of the game cards. A plurality of player card pockets are affixed to an outer surface of the card caddy each corresponding to one of the plurality of players. The card pockets retain the game cards won by the highest bidder of the players. In play, first through last ones of the players may successively bid on the players ability to correctly answer a subset number of the N number of questions based upon observation of the backside of the individual one of the game cards, whereupon the individual one of the game cards is withdrawn from the card caddy dispensing slot and the highest bidder of the players must attempt to correctly answer the subset number of questions bid asked by another of the players. The individual one of the game cards is thereafter considered won by the highest bidder if the subset number of questions are successfully answered and, alternatively, the card is returned to the card caddy insertion slot if the subset number of questions are not successfully answered. The player having first won a predetermined number of the game cards may be considered as having won the game.

A card caddy for a plurality of game cards in accordance with the present invention includes a generally rectangular bottom member having first and second pairs of oppositely disposed peripheral edges thereof. A pair of generally parallel and spaced apart side members having respective lower edges thereof are affixed to the first pair of the peripheral edges of the bottom member, the side members extending generally perpendicularly therefrom to respective upper edges thereof. First and second generally parallel and spaced apart end members abut the side members, the end members having respective lower edges thereof affixed to the second pair of oppositely disposed peripheral edges. The end members extend generally perpendicularly therefrom to respective upper edges thereof. The first end member has a window therein communicating with the upper edge thereof. A cover member is affixed to at least the side member upper edges, the cover member having end portions thereof being noncontiguous to the first and second end member's upper edges forming respective first and second card slots therewith. In use, the game cards may be inserted into the second card slot and removed from the first card slot by digital manipulation of at least one of the plurality of game cards through the window.

BRIEF DESCRIPTION OF THE DRAWINGS

The foregoing and other features and objects of the present invention and the manner of attaining them will become more apparent and the invention will be best understood by reference to the following description of a preferred embodiment taken in conjunction with the accompanying drawings wherein:

FIG. 1A is an isometric view of a portable card game in accordance with the present invention illustrating the card caddy thereof and plurality of cards comprising a knowledge game apparatus and illustrating the card windows for viewing the card backsides;

FIG. 1B is an isometric view of the embodiment of the portable card game of FIG. 1A having a caddy cover affixed thereto and illustrating the card pockets for retention of cards won by players of the knowledge game apparatus of the present invention;

FIG. 2 is a top plan view of the caddy cover shown in FIG. 1B illustrating a handle slot and edge portions for interfacing with the card caddy to form card withdrawal and insertion slots;

FIGS. 3A and 3B illustrate the backside and front side respectively of a card for use in playing the knowledge game apparatus and method of the present invention in a United States version thereof; and FIGS. 4A and 4B illustrate the backside and front side respectively of a card for use with the knowledge game apparatus and method of the present invention in a World version thereof.

DESCRIPTION OF A PREFERRED EMBODIMENT

With reference to FIGS. 1A and 1B a knowledge game apparatus 10 in accordance with the present invention is shown. Knowledge game apparatus 10 comprises, in pertinent part, card caddy 12 for holding a plurality of game cards 14 within card trays 16, 18 formed therein. Card caddy 12 allows for the dispensing of as yet unasked question game cards 14 to the players of knowledge game apparatus 10 as well as serving to retain all other game cards 14. Card caddy 12 may be preferably manufactured out of plastic, wood or other suitable structural material.

Card caddy 12 includes opposite and generally parallel and spaced apart end members 21, 23. Similarly, card caddy 12 includes generally parallel and opposite spaced apart side members 25, 27. End members 21 and 23 present an exterior front face 20 and rear surface 22 respectively. In like manner, side members 25 and 27 present exterior side surfaces 24 and 26 respectively.

Partition 28 extends longitudinally from end member 21 to end member 23 thereby forming card trays 16 and 18 within card caddy 12. A plurality of game cards 14 may be retained within card caddy 12 as shown upon bottom surface 40 of card caddy 12.

Card caddy 12 further includes handle 30 which may be optionally utilized in conjunction therewith to enhance the portability of knowledge game apparatus 10. As shown, handle 30 is affixed to upper edge 34 of partition 28. Handle 30 includes a pair of perpendicularly disposed uprights 36 extending from partition 28 and adjoining crossmember 38 forming handle 30.

Card caddy 12 further includes respective card windows 42 and 44 formed in end member 21 communicating with card trays 16 and 18. Card windows 42, 44 allow a player of knowledge game apparatus 10 to view backside 82 of individual card 80 of the plurality of game cards 14 as will be more fully described hereinafter.

End members 21, 23 and side members 25, 27 also include upper peripheral edges 54 thereof. Upper peripheral edges 54 adjoin a removable caddy cover 56 as shown.

Referring additionally now to FIG. 2 caddy cover 56 of card caddy 12 is shown in more detail. Caddy cover 56 also includes a pair of parallel and spaced apart longitudinal lips 58 for engaging side surfaces 24 and 26. Caddy cover 56 includes handle slot 60 comprising an aperture therethrough for positioning caddy cover 56 over handle 30 of card caddy 12. Handle slot 60 communicates between undersurface 64 and uppersurface 66 of caddy cover 56. Tabs 62 adjoin upper peripheral edges 54 of end members 21 and 23 as shown. Caddy cover 56 further includes edge portions 68 corresponding to card windows 42 and 44 providing a noncontiguous relationship between caddy cover 56 and end members 21 and 23. By the provision of edge portions 68, card withdrawal slots 70 and 72 are formed with respect to end member 21 and card insertion slots 74 and 76 are formed with respect to end member 23.

Card caddy 12 further incorporates a plurality of card pockets 46 for retention of those of game cards 14 won by a player of knowledge game apparatus 10 as will be more fully described hereinafter. Card pockets 46 may be affixed to side surfaces 24 and 26 of side members 25 and 27 respectively as well as to rear surface 22 of end member 23. In this manner, card pockets 46 may be furnished corresponding to six players of knowledge game apparatus 10.

Card pockets 46 comprise a slot 50 for engagement of game cards 14 as well as a bar 48 laterally displaced from, for example, side surface 24 by means of a pair of upstanding posts 52. In use, selected ones of game cards 14 may be inserted into a card pocket 46 between bar 48 and side surface 24 to engage slot 50.

Referring additionally now to FIGS. 3A and 3B an individual card 80 of the plurality of game cards 14 of knowledge game apparatus 10 is shown. Individual card 80 includes a backside 82 and opposite front side 84. Backside 82 may include, for example, a pictorial representation of a geographic or demographic unit, such as a state, so as to afford a player of knowledge game apparatus 10 an indication of the category of questions on the opposite front side 84 thereof.

By way of example only, a representative individual card 80 would depict the state of Colorado on backside 82. Front side 84 may then include such questions as:

1. The capitol of this state is? (Denver);
2. This state is commonly known as as the (Centennial) state;
3. This Colorado Senator ran for President in 1984 (Gary Hart);
4. The highest airport in the United States is in this Colorado mountain town (Leadville);
5. What type of rock has potential oil resources in this state (oil shale).

Referring additionally now to FIGS. 4A and 4B an individual card 80 is shown for use in a world version of knowledge game apparatus 10 as will be more fully described hereinafter. In this exemplary version of knowledge game apparatus 10, backside 82 includes a pictorial representation of a geographic feature with a subject category superimposed thereupon. Thus, by viewing backside 82 of individual card 80, a player of knowledge game apparatus 10 will be afforded an indication of the question category on front side 84 thereof. As an example only, an individual card 80 may have a pictorial representation of the continent on Africa with the category of "Geography" superimposed thereupon. In this regard, representative questions appearing on front side 84 thereof might include:

1. The capitol of Libya is? (Tripoli);

2. The country on the south side of the Straight of Gibraltar is? (Morocco);
3. What is the large river flowing through Egypt? (Nile);
4. Capetown is in what country? (South Africa);
5. The largest lake on this continent is? (Victoria).

Knowledge game apparatus 10 may utilize trivia as a source of questions and answers in the playing thereof. As above described, a United States and World version of knowledge game apparatus 10 may be provided merely by the utilization of appropriate game cards 14. Thus, by merely changing game cards 14, knowledge game apparatus 10 may be made playable with any category of questions. Card caddy 12 is utilized as a holder for the plurality of game cards 14 to dispense unasked individual card 80 of the plurality of game cards 14 therein contained. Individual card 80 viewable through either card window 42 or card window 44 displays backside 82 thereof to indicate to a player a question category contained on front side 84 thereof not viewable to the players.

As an object of knowledge game apparatus 10, a player must collect those of the plurality of game cards 14 he has won in his corresponding card pocket 46 whereupon the first of the players to reach a predetermined number of cards won and thereafter retained will be considered to be the winner. A player will receive one of game cards 14 if he answers the number of questions he had bid correctly contained on front side 84 of individual card 80. The predetermined number of cards a player must accumulate to win may be set to vary with the length of the game the players would like to have.

REPRESENTATIVE RULES

Start of Play—in the embodiment of knowledge game apparatus 10 shown, two individual cards 80 will have their backsides 82 thereof viewable through card windows 42 and 44 in end member 21. Play may begin with individual card 80 viewable through card window 42 having a pictorial representation of a question category viewable therethrough. With all players knowing the category of individual card 80, the players may bid on individual card 80 gambling on how many of the questions contained on front side 84 thereof they think they can answer correctly. As a suggested method of play, the player closest to the 11 o'clock position of card caddy 12 will begin play as the "last bidder". The last bidder of the players of knowledge game apparatus 10 is a preferred status in that this player will have the choice to match any other players bid on individual card 80 or refuse to match the highest bid and force the highest bidder to attempt to answer the questions on front side 84 thereof. The player to the left of the last bidder will begin the bidding which will thereafter continue in a clockwise fashion. Each player may bid either a higher bid than the preceding bid or, pass the bid before it comes to the last bidder. When it comes to the last bidder, the player may match the highest bid (for example three) and attempt to answer the three questions out of the five contained on front side 84 correctly, or refuse to match the bid and allow the highest bidder to attempt to answer three questions out of five correctly.

If any player answers the number of questions they bid correctly, they will retain individual card 80 in their respective card pocket 46 attempting to accumulate, for example, seven cards in order to win the game. If any player does not correctly answer the number of questions bid on any card, he will not be allowed to bid on the next card but may be allowed to participate on the following card. An individual card 80 not successfully answered would then be reinserted into card insertion slot 74 or card insertion slot 76 of card caddy 12. In play, individual card 80 is withdrawn from either card withdrawal slot 70 on card withdrawal slot 72 whereupon the questions contained on front side 84 thereof are asked by another player not the highest bidder of that individual card 80.

Only one player will be allowed to answer the questions on individual card 80 because players may not match another's bid unless they are the last bidder. In this instance, only the last bidder will get to attempt to answer the questions on individual card 80. Players are not required to bid but may pass the bid if they do not want to bid a higher bid. However, a player must bid at least one in order to be able to answer the questions on individual card 80.

When individual card 80 is presented for bid, a player will have only one chance to bid and must bid in turn in a clockwise fashion beginning with the player to the left or the "last bidder" until it reaches the last bidder, who will then end the bidding. The "last bidder" status will pass in clockwise fashion to the next player unless the next player is not allowed to bid because he did not answer the number of questions he bid correctly on the previous one of individual card 80. In this case, the last bidder status shall pass to the next player in a clockwise motion.

As an alternative, more competitive rules may be added to the play of knowledge game apparatus 10. For example, if a player bids or matches a bid of four on a card and answers four questions correctly, he could then receive the last bidder status for the next card. Additionally, if a player bids and answers five questions correctly on any individual card 80, he may receive the individual card 80 he bid on and be able to take another one of game cards 14 from another players card pocket 46.

In a U.S. version of knowledge game apparatus 10, questions may be asked about the different states in the United States. Each one of the questions on front side 84 of individual card 80 will be about the state depicted on backside 82 thereof. Since the state which may be depicted is on backside 82 thereof viewable through card window 42 or card window 44, the players will know which states' questions they are bidding on. The questions for such United States version will comprise a variety of type of questions about that particular state including geography, people, cities, etc.

In a World version of knowledge game apparatus 10 questions from specific categories, for example people, history, government, etc. and other certain land areas for example Africa, Europe, etc. may be used. Backside 82 of individual card 80 may have a land area depicted superimposed with a topic category named so that each player will know what he is bidding on. The questions on front side 84 thereof will relate to the land area and category from backside 82.

It should be noted that both the United States and World versions of knowledge game apparatus 10 are played with the same rules and card caddy 12. Additional version of knowledge game apparatus 10 may be readily affectuated utilizing but a different set of game cards 14. It should further be noted that the above described games rules may be printed and secured to undersurface 64 of caddy cover 56 while a geographic representation of either the U.S. or World version of knowledge game apparatus 10 may be secured to upper surface 66 of caddy cover 56. Other versions of card caddy 12 may include only a single card tray and have a handle secured to any other portion thereof including the cover itself.

What has been provided therefore is an improved knowledge game apparatus and method and card caddy therefor. The knowledge game apparatus and method and card caddy of the present invention is durable, portable, and can be played anywhere without the necessity of a game board and includes added interest to a game experience by incorporating bidding and bluffing. The apparatus method and caddy of the present invention may be readily adapted to a skill level of persons of any age or knowledge background merely by changing cards and provides a consistently challenging and enjoyable activity.

While there have been described above the principles of the present invention in conjunction with specific apparatus, it is to be clearly understood that the foregoing description is made only by way of example and not as a limitation to the scope of the invention. In particular, it should be noted that while card caddy 12 has been shown to incorporate a pair of card trays 16 and 18, other versions thereof may incorporate but a single card tray. Moreover, it should be noted that more players may utilize knowledge game apparatus 10 than there are corresponding card pockets 46 merely by having the additional players hold those of game cards 14 they have won in their hand.

What is claimed is:

1. A knowledge game for a plurality of players comprising:
    a plurality of game cards having a backside thereof illustrative of a question category and an opposite front side thereof having N number of questions relating to said question category;
    a card caddy for containing said game cards having an insertion slot for receipt of said game cards not won by a highest bidder of said players and a dispensing slot for withdrawal of an individual one of said cards, said card dispensing slot including a window for viewing said backside of said individual one of said game cards; and
    a plurality of player card pockets affixed to an outer surface of said card caddy each corresponding to one of said plurality of players, said card pockets for retention of said game cards won by said highest bidder of said players.
    whereby first through last ones of said players may successively bid on said players ability to correctly answer a subset number of said N number of questions based upon observation of said backside of said individual one of said game cards whereupon said individual one of said game cards is withdrawn from said card caddy dispensing slot and said highest bidder of said players must attempt to correctly answer said subset number of questions bid asked by another of said players, said individual one of said game cards thereafter being considered won by said highest bidder if said subset number of questions are successfully answered and alternatively returned to said card caddy insertion slot if said subset number of questions are not successfully answered whereupon said player first having won a predetermined number of said game cards may be considered as having won said game.

2. The knowledge game of claim 1 wherein said card caddy further comprises a handle secured thereto.

3. The knowledge game of claim 1 wherein said question category is related to a geographic area.

4. The knowledge game of claim 1 wherein said question category is related to a demographic area.

5. The knowledge claim of claim 1 wherein said N number of questions is five.

6. A method for playing a knowledge game for a plurality of players comprising the steps of:
    furnishing a plurality of game cards having a backside thereof illustrative of a question category and an opposite front side thereof having N number of questions relating to said question category;
    containing said game cards in a card caddy having insertion and dispensing slots thereof;
    observing said backside of an individual one of said game cards through a window communicating with said dispensing slot;
    successively bidding by first through last ones of said players on said player's ability to correctly answer a subset number of said N number of questions on said front side of said individual one of said game cards;
    withdrawing said individual one of said game cards;
    asking said subset number of questions of a highest bidder of said players by another of said players;
    attempting to correctly answer said subset number of questions by said highest bidder of said players;
    returning said individual one of said game cards to said card caddy insertion slot if said subset number of questions are not successfully answered; and
    retaining said individual one of said game cards by said highest bidder if said subset number of questions are successfully answered
    whereby said player first having retained a predetermined number of said game cards may be considered as having won said game.

7. The method of claim 6 further comprising the step of:
    affixing a plurality of player card pockets to an outer surface of said card caddy each corresponding to one of said plurality of players.

8. The method of claim 7 further comprising the step of:
    placing said individual one of said game cards in one of said player card pockets corresponding to said player having successfully answered said subset number of questions thereon.

9. A caddy for a plurality of game cards comprising:
    a generally rectangular bottom member having first and second pairs of oppositely disposed peripheral edges thereof;
    a pair of generally parallel and spaced apart side members having respective lower edges thereof affixed to said first pair of said peripheral edges, said side members extending generally perpendicularly therefrom to respective upper edges thereof;
    first and second generally parallel and spaced apart end members abutting said side members, said end members having respective lower edges thereof affixed to said second pair of oppositely disposed peripheral edges, said end members extending generally perpendicularly therefrom to respective upper edges thereof, said first end member having a window therein communicating with said upper edge thereof; and a cover member affixed to at least said side member upper edges, said cover member having end portions thereof being noncontiguous to said first and second end member upper edges forming respective first and second card slots therewith whereby said game cards may be inserted into said second card slot and removed from said first card slot by digital manipulation of at least one of said plurality of game cards through said window.

10. The caddy of claim 9 further comprising:

a partition extending intermediately between said side members defining first and second card trays within said caddy.

11. The caddy of claim 9 further comprising:

a handle affixed to said cover.

12. The caddy of claim 10 further comprising:

a handle affixed to said partition extending through a slot in said cover.

13. The caddy of claim 9 wherein said cover is frictionally and removably secured to said side members.

14. The caddy of claim 9 wherein said caddy comprises a plastic structure.

15. The caddy of claim 9 wherein said caddy comprises a wooden structure.

16. The caddy of claim 9 wherein said window is of sufficient dimension to allow viewing of a back of said game card adjacent said first end member.

17. The caddy of claim 9 further comprising:

game card pockets affixed to an outer surface of at least one of said side members.

18. The caddy of claim 9 wherein said cover is removable.

19. The caddy of claim 18 wherein said cover includes game card rules affixed to a surface thereof.

* * * * *